E. H. WINGQVIST.
BEVEL GEAR.
APPLICATION FILED JAN. 26, 1917.
1,285,870.
Patented Nov. 26, 1918.
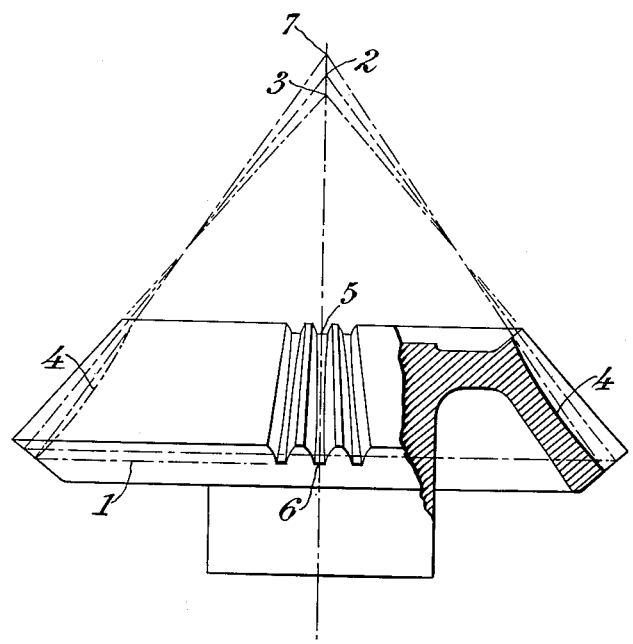
WITNESSES:
René Bruine
J. J. Wallace
INVENTOR :
Erik Hjalmar Wingqvist
By Attorneys,
Fraser, Tink & Myers

UNITED STATES PATENT OFFICE.

ERIK HJALMAR WINGQVIST, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

BEVEL-GEAR.

1,285,870.   Specification of Letters Patent.   Patented Nov. 26, 1918.

Application filed January 26, 1917. Serial No. 144,581.

*To all whom it may concern:*

Be it known that I, ERIK HJALMAR WING-QVIST, a subject of the King of Sweden, residing at Gottenborg, in the Kingdom of Sweden, have invented certain new and useful Improvements in Bevel-Gears, of which the following is a specification, reference being had to the drawing accompanying and forming a part thereof.

It has before been proposed to construct so-called octoid bevel gears in which the bottoms of the spaces or gaps between the teeth are somewhat raised toward the inner ends of the teeth so that the said bottoms, if produced, intersect the pitch cone between the apex of the pitch cone and the inner ends of the teeth. Particularly it has been proposed to construct such gears in which the bottoms of the gaps coincide or substantially coincide with a conical surface the apex of which is situated, measured from the gear wheel, beyond the apex of the pitch cone. By such means the advantage is gained, among others, that the teeth will, practically, be of uniform strength throughout their length. Preferably, also the top faces of the teeth, if produced, intersect the pitch cone between its apex and the inner ends of the teeth, by which the further advantage is gained that the load will successively increase and successively decrease, so that the gear will operate smoothly and noiselessly.

It is to be observed that the normal octoid teeth are straight or radial teeth produced when the plane side surfaces of the imagined generating teeth intersect each other, if produced, along lines converging toward the center of the generating wheel, the skew teeth produced when the said lines touch a sphere having its center on the axis of the generating wheel being a variation of the normal octoid teeth. In this specification, however, the general term octoid wheels is understood always to comprise bevel wheels having either radial or skew, *i. e.* non-radial, teeth.

This invention relates to gears of the said type. The gear wheel according to this invention differs from those hereinbefore referred to in that respect that the bottoms of the gaps are concave in their longitudinal direction. By such means two important advantages are gained, viz. for one thing that the gaps can be formed, according to the generating process, by a pair of rotary milling-cutters in a single working operation and, for the other, that the side surfaces of the teeth can be ground by relatively small grinding disks, which, on account of the concave bottoms, have an opportunity to enter deeper into the gaps.

According to this invention the bottoms of the gaps will not have the same width throughout, as they will be somewhat narrower at the middle than at the ends, but it is an essential feature that the width of the gaps will be the same or substantially the same at both ends of a gap.

The gears according to this invention are, preferably, generated by two rotary milling-cutters placed at an angle to each other and having plane cutting teeth facing the opposite side faces of two adjacent teeth, the gear wheel blank on the one hand and the two milling-cutters on the other being caused to perform the same movement relatively to each other as that of a tooth of a rack or of a so-called generating wheel meshing with the gear wheel to be made. It is, however, to be observed that the milling-cutters must be placed in such positions relatively to each other and to the gear wheel blank that a plane containing the axes of the milling-cutters passes through the deepest point of the bottom of the gap or substantially so, since otherwise the two ends of the gap would not obtain the same width.

The grinding of the gear wheel is performed in a manner similar to the milling process, the milling-cutters being simply replaced by two grinding disks having plane grinding surfaces facing the opposite sides of two adjacent teeth, said disks being caused to enter a gap and grind the sides thereof. As hereinbefore mentioned, the sides of a gap can be ground in their whole extension, particularly also those portions thereof situated next to the bottoms of the gaps, which is not possible in gears in which the bottoms of the gaps are formed on straight lines in the longitudinal direction.

In the drawing, a partial side elevation and partial sectional view of a gear according to the invention is shown.

Referring to the drawing, the side faces of the teeth of the gear 1, as hereinbefore mentioned, are of the ordinary theoretically correct form, said side faces converging in the usual manner toward the apex 2 of the pitch cone, while the top faces of the teeth coincide with a conical surface the apex 3 of which is situated nearer to the gear than is the apex 2 of the pitch cone. Obviously, the bottoms 4 of the gaps, which are concave in their longitudinal direction, cannot coincide with a conical surface, but they intersect at their ends 5, 6 a conical surface the apex 7 of which is situated so far beyond the apex 2 of the pitch cone, measured from the gear wheel, that the ends of the said bottoms have substantially the same width.

I claim as my invention:—

A bevel gear having octoid teeth, in which the bottom of each gap is concave in its longitudinal direction and of substantially the same width at its ends, and in which the top face of each tooth is of substantially the same width throughout its length.

In testimony whereof I affix my signature.

ERIK HJALMAR WINGQVIST.